(12) United States Patent
Tan et al.

(10) Patent No.: US 10,782,508 B2
(45) Date of Patent: Sep. 22, 2020

(54) IMAGING APPARATUS INCLUDING AN OPTICAL ASSEMBLY FOR REFRACTING AMBIENT LIGHTS TO BYPASS SHIELDING MEMBERS IN DISPLAY PANEL AND METHOD FOR PRODUCING THE SAME AND MOBILE TERMINAL DEVICE

(71) Applicant: BOE Technology Group Co., Ltd., Beijing (CN)

(72) Inventors: Jifeng Tan, Beijing (CN); Liqiang Chen, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 65 days.

(21) Appl. No.: 16/169,558

(22) Filed: Oct. 24, 2018

(65) Prior Publication Data
US 2019/0285850 A1     Sep. 19, 2019

(30) Foreign Application Priority Data

Mar. 13, 2018 (CN) .......................... 2018 1 0207106

(51) Int. Cl.
*G02B 13/00* (2006.01)
*H04N 5/225* (2006.01)

(52) U.S. Cl.
CPC ....... *G02B 13/005* (2013.01); *G02B 13/0045* (2013.01); *H04N 5/2254* (2013.01); *H04N 5/2256* (2013.01)

(58) Field of Classification Search
CPC .............. G02B 13/005; G02B 13/0045; G02B 13/0055; G02B 9/10; G02B 3/005;
(Continued)

(56) References Cited

U.S. PATENT DOCUMENTS 9,749,532 B1 * 8/2017 Hinkel ................. G02B 27/646
2006/0012739 A1 1/2006 Shibazaki
(Continued)

FOREIGN PATENT DOCUMENTS

CN         1176008 A      3/1998
CN       101014899 A      8/2007
(Continued)

OTHER PUBLICATIONS

Office Action issued in corresponding Chinese Patent Application No. 201810207106.7, dated Sep. 30, 2019.

*Primary Examiner* — Lin Ye
*Assistant Examiner* — Chan T Nguyen
(74) *Attorney, Agent, or Firm* — McDermott Will & Emery LLP

(57) ABSTRACT

An imaging apparatus and a method for producing the same are provided. The imaging apparatus includes a display panel, including a first face and a second face arranged opposite to each other; an imaging device on the second face of the display panel; and an optical assembly in an optical path where ambient lights pass through the first face and the second face in sequence and enter the imaging device, the optical assembly being configured to refract at least part of the ambient lights so that the refracted lights bypass shielding members in the display panel and are incident on the imaging device.

17 Claims, 11 Drawing Sheets

(58) Field of Classification Search
CPC .... G02B 5/003; H04N 5/2256; H04N 5/2254; G09F 9/35; G09F 9/33; H04M 1/0266
USPC .......................................................... 348/335
See application file for complete search history.

(56) References Cited

U.S. PATENT DOCUMENTS

| | | | | |
|---|---|---|---|---|
| 2006/0114574 A1* | 6/2006 | Sekita | .................. | G02B 15/177 |
| | | | | 359/689 |
| 2008/0094716 A1* | 4/2008 | Ushiro | .............. | G02F 1/133526 |
| | | | | 359/620 |
| 2018/0275320 A1* | 9/2018 | Hsieh | .................. | G02B 13/004 |
| 2019/0349503 A1 | 11/2019 | Wang et al. | | |

FOREIGN PATENT DOCUMENTS

| | | | | | |
|---|---|---|---|---|---|
| CN | 106950738 A | 7/2017 | | | |
| CN | 107071244 A | 8/2017 | | | |
| CN | 107277316 A | 10/2017 | | | |
| JP | H11-271749 A | 10/1999 | | | |
| JP | H11271749 | * 10/1999 | .............. | G02F 1/13 | |
| JP | 2004199006 A | 7/2004 | | | |

\* cited by examiner

IMAGING APPARATUS INCLUDING AN OPTICAL ASSEMBLY FOR REFRACTING AMBIENT LIGHTS TO BYPASS SHIELDING MEMBERS IN DISPLAY PANEL AND METHOD FOR PRODUCING THE SAME AND MOBILE TERMINAL DEVICE

CROSS-REFERENCE TO RELATED APPLICATION

This application claims benefit of the Chinese Patent Application No. 201810207106.7, filed with the State Intellectual Property Office of China on Mar. 13, 2018, which is incorporated herein by reference in its entirety.

BACKGROUND OF THE DISCLOSURE

Field of the Disclosure

The present disclosure relates to the technical field of display, and in particular, to an imaging apparatus, a method for producing the imaging apparatus and a mobile terminal device.

Description of the Related Art

Recently, attention has been paid on a ratio of screen to body for an imaging apparatus such as smart mobile phone, which is a proportion of a display area on a display panel to an entire area of the display panel within the imaging apparatus. However, except a display screen (i.e., the display area on the display panel), a front face of the display panel is typically provided with components such as a capacitive fingerprint sensor, an opening for a telephone receiver, a front camera (and a flashlight), a distance sensor and a light sensor, or the like, on a non-display area of the display panel. These factors adversely affect the ratio of screen to body of the display panel.

SUMMARY

An embodiment of the present disclosure provides an imaging apparatus, including: a display panel, including a first face and a second face opposite to each other; an imaging device on the second face of the display panel; and an optical assembly in an optical path where ambient lights pass through the first face and the second face in sequence and enter the imaging device, the optical assembly being configured to refract at least part of the ambient lights so that the refracted lights bypass shielding members in the display panel and are incident on the imaging device.

In some embodiments, the optical assembly includes a first optical component at one side where the first face of the display panel is located and a second optical component at the other side where the second face of the display panel is located.

In some embodiments, the first optical component includes a light diverging device and the second optical component includes a light converging device.

In some embodiments, the light diverging device includes a concave lens array and the light converging device includes a convex lens array.

In some embodiments, the shielding members in the display panel include gate lines and data lines within the display panel; the concave lens array includes a plurality of concave lenses, the convex lens array includes a plurality of convex lenses, and the plurality of concave lenses and the plurality of convex lenses are provided in one-to-one correspondence and constitute a plurality of pairs of concave lens and convex lens, wherein each pair of concave lens and convex lens is provided to align with one of the gate lines or one of the data lines within the display panel in position.

In some embodiments, the concave lens and the convex lens of each pair of concave lens and convex lens have a same focus point, and optical parameters of the concave lens and the convex lens of the each pair of concave lens and convex lens meet the following relationship:

$$\frac{D1}{F1} = \frac{D2}{F2} = \frac{D2}{F1+D}$$

where F1 and D1 indicate a focal length and an aperture of the concave lens respectively, D indicates a thickness of the display panel, and F2 and D2 indicate a focal length and an aperture of the convex lens respectively; the aperture D2 of the convex lens satisfies the following condition:

$$d \leq D2 \leq d+d1;$$

where d indicates a width of each of the gate lines or each of the data lines, d1 indicates a width of a pixel region corresponding to the each pair of concave lens and convex lens within the display panel.

In some embodiments, the aperture D1 of the concave lens is equal to the width d of each of the gate lines or each of the data lines, and a distance between the concave lens and the convex lens of the each pair of the concave lens and convex lens is equal to the thickness D of the display panel.

In some embodiments, the concave lens and the convex lens of each pair of concave lens and convex lens have different focus points from each other, and optical parameters of the concave lens and the convex lens of the each pair of concave lens-convex lens meet the following relationship:

$$\frac{1}{a2} + \frac{1}{b2} = \frac{1}{F2}$$

$$i.a2 = F1 + D,$$

$$\frac{D1}{F1} = \frac{D2}{F1+D},$$

where F1 and D1 respectively indicate a focal length and an aperture of the concave lens, F2 and D2 respectively indicate a focal length and an aperture of the convex lens, b2 indicates a distance from the imaging device to the convex lens, a2 indicates a distance from the convex lens in the each pair of the concave lens and convex lens to the focus point of the concave lens, and D indicates a thickness of the display panel; wherein the aperture D2 of the convex lens satisfies the following condition: $d \leq D2 \leq d+d1$; where d indicates a width of each of the gate lines or each of the data lines, d1 indicates a width of a pixel region corresponding to the each pair of concave lens and convex lens within the display panel.

In some embodiments, the aperture D1 of the concave lens is equal to the width d of each of the gate lines or each of the data lines, and a distance between the concave lens and the convex lens of the each pair of the concave lens and convex lens is equal to the thickness D of the display panel.

In some embodiments, the first face includes a display area.

In some embodiments, the display area fully covers the first face.

In some embodiments, a pixel region within the display panel corresponding to the imaging device is configured to transmit at least part of the ambient lights passing through the first face to the second face.

In some embodiments, the imaging apparatus further includes a controller, configured to stop light emitting operation of a pixel region corresponding to the imaging device before the imaging device takes photos, and to restore the light emitting operation of the pixel region corresponding to the imaging device after the imaging device takes photos.

In some embodiments, the first optical component is in a form of layer, and the layer of the first optical component is directly located on the first face of the display panel.

In some embodiments, the second optical component is in a form of layer, and the layer of the second optical component is directly located on the second face of the display panel.

In some embodiments, at least part of the first optical component or the second optical component includes column lenses or spherical lenses.

An embodiment of the present disclosure also provides a mobile terminal device, including the imaging apparatus as describe in the above embodiment.

In some embodiments, the optical assembly comprises a first optical component at one side where the first face of the display panel is located and a second optical component at the other side where the second face of the display panel is located.

In some embodiments, the first optical component comprises a light diverging device and the second optical component comprises a light converging device.

An embodiment of the present disclosure also provides a method for producing the imaging apparatus as described above, the method including: providing the display panel; providing the imaging device on the second face of the display panel; and providing the optical assembly in the optical path where the ambient lights pass through the first face and the second face in sequence and enter the imaging device.

BRIEF DESCRIPTION OF THE DRAWINGS

In order to explain technical solutions of embodiments of the present disclosure more clearly, drawings for the embodiments will below be described briefly. It should be understood that the drawings described below only involve in some of the embodiments of the present disclosure, rather than limiting to the present disclosure, in which.

DETAILED DESCRIPTION OF EMBODIMENTS OF THE DISCLOSURE

Figure 1:
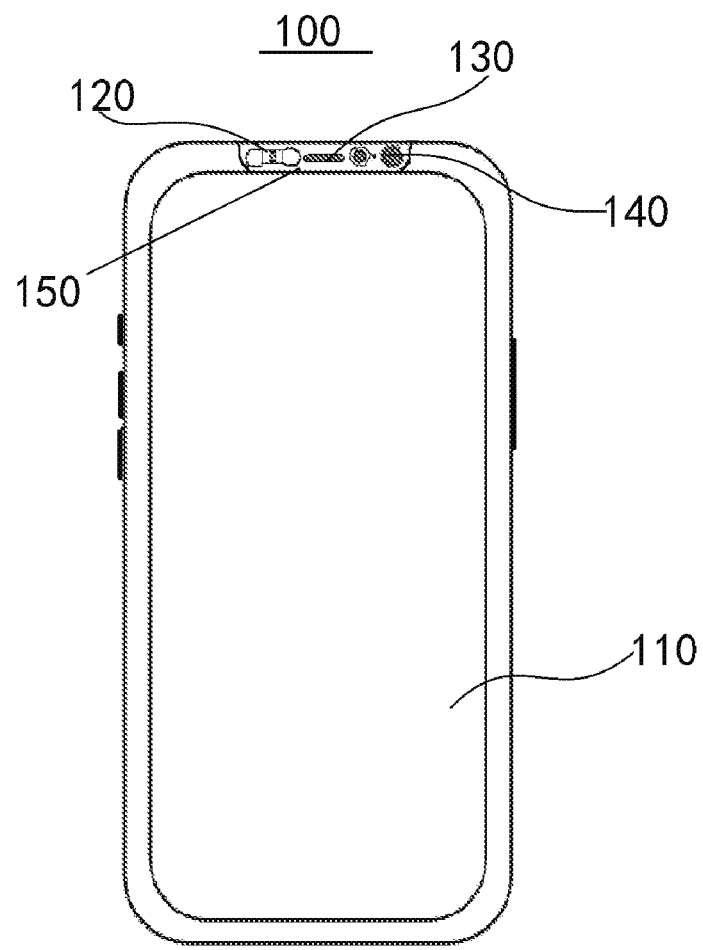
FIG. 1 depicts a schematic view of a structure of an imaging apparatus.

In order to set forth purpose, technical solutions and advantages of the present disclosure more clearly, embodiments of the present disclosure will be described in detail in conjunction with the accompanying drawings. It should be understood that the description to the embodiments below is intended to interpret and explain the general concept of the present disclosure, rather than limiting the present disclosure. Throughout the specification and accompanying drawings, the same or similar reference numerals indicate the same or similar components or members. For sake of clarity, the figures are not drawn in a real scale, and some known components and structures might be omitted in the figures.

Unless defined otherwise, technical terminologies or scientific terminologies used in the present disclosure shall have the general meanings as understood by the person having the ordinary skill in the art. The terms of "first", "second" and the like used in the present disclosure do not mean any sequences, quantities or importance, and are only used to distinguish different integral parts thereof. Phrase of "a" or "one" does not exclude the meaning of "plural". Terms of "comprise", "include" and "contain" and the like are meant that the element or article in front of this term covers elements or articles and their equivalents listed below this term, but do not exclude other elements or articles. Terms of "connection" or "connected" and the like are not restricted to physical or mechanical connection, but can include electrical connection, regardless of direct or indirect connection. Terms of "upper", "lower", "left", "right", "top" or "bottom" and the like are only used to indicate the relative position relationship; and when the absolute position of the described object is changed, such relative position relationship might be changed accordingly. When the element such as "layer", "film", "region", "area" or "base substrate" is called as locating at the upper side or lower side of another element, this element can be directly located at the upper side or lower side of the another element, or there can be an intermediate element between the object and the another element.

As requirements on the ratio of screen to body of the display panel in the imaging apparatus such as mobile phones increase gradually, it is desirable that a front face (one face where the display area is located) of the imaging apparatus mostly or even entirely can display images. To this end, the fingerprint sensor, the telephone receiver, the distance sensor and the light sensor or the like which were located on the front face of the imaging apparatus are modified so as to increase the ratio of screen to body. Specifically, the capacitive fingerprint sensor can be disposed on a side face or a back face of the imaging apparatus, which to some degrees increases the ratio of screen to body. The telephone receiver can be replaced by a piezoelectric ceramic telephone receiver and placed on the back face of the imaging apparatus. It is possible to use an ultrasonic distance sensor at the back face of the imaging apparatus. An ambient light sensor can be placed on the top of a terminal frame. These measures all effectively increase the ratio of screen to body of the imaging apparatus to some degrees.

However, the designs about the front camera and the front flash light are the most difficult challenges for increasing the ratio of screen to body of the imaging apparatus or more difficult aspects to be improved. One solution is to use a turn-over camera. Specifically, this camera can function to take photos of both a user himself and landscape. But, such turn-over camera has problems of a complex structure and large thickness, needing to be manually turned-over, and having poor appearance of the entire apparatus and the like.

With reference to FIG. 1, it shows a schematic view of a structure of an imaging apparatus 100. By means of a special-shaped cutting method to the display panel 110, a special-shaped area 150 is cut out within a non-display area on the top of the front face of the display panel 110, so that one or more of a 3D front camera 120, a telephone receiver 130 and an infrared biometric recognition sensor group 140 and so on are provided into this special-shaped area 150. The special-shaped cutting might degrade the visual appearance of the display panel 110, and may decrease cutting yield of the display panel 110, thereby significantly increasing the cost thereof.

Figure 2A:
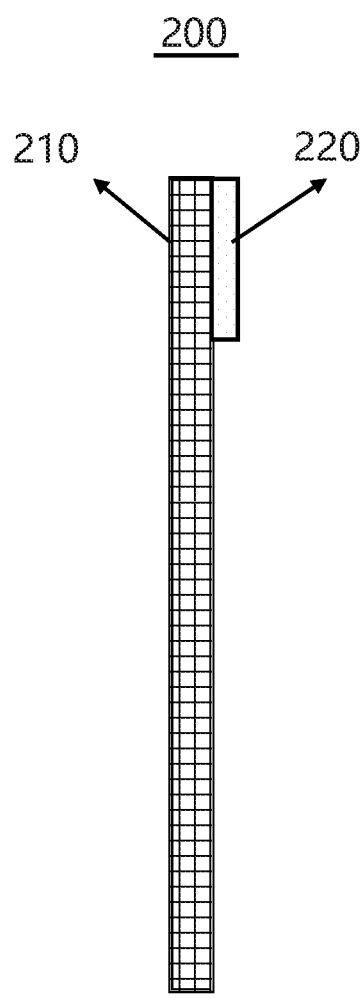
FIG. 2A depicts a side view of a structure of another imaging apparatus.

With reference to FIG. 2A, it depicts a side view of a structure of another imaging apparatus 200. In FIG. 2A, the display panel 210 is not cut for a special-shaped, but entirety of the front face of the display panel 210 functions as the display area. In this case, the front camera which was often placed in the non-display area at the front face of the display panel is now provided at the back face of the display panel. However, metal grids composed of metal lines such as gate lines and data lines in the display panel would cause a problem of blocking the camera 220 which is disposed at the back face when it is taking photos. This is similar to a screen door effect.

Figure 2B:
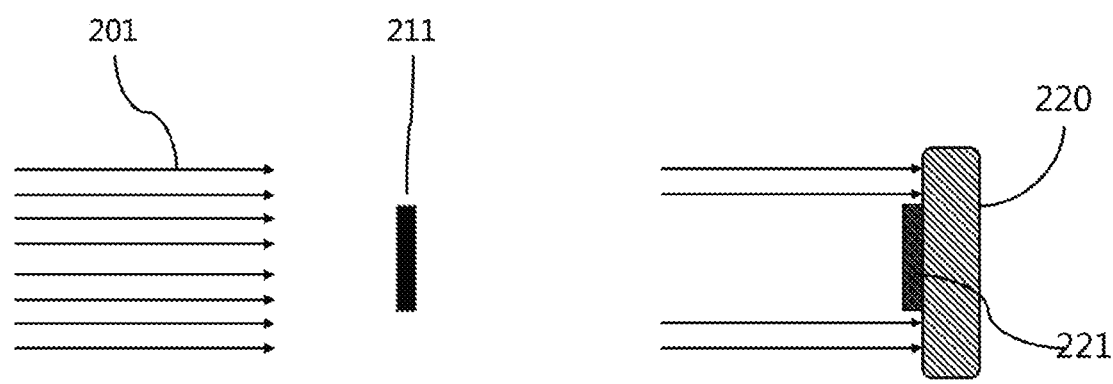
FIG. 2B is a schematic view of a principle of image loss caused due to an imaging device within the imaging apparatus as shown in FIG. 2A being blocked.

Specifically, with reference to FIG. 2B, it depicts a schematic view of a principle of image loss caused due to an imaging device 220 (for example, in this case the back camera) in the imaging apparatus 200 as shown in FIG. 2A being blocked by the above metal lines or part of the metal lines. After ambient lights 201 from the external environment (as shown by arrow lines in the figure) are incident onto the display panel 210, they will be blocked by the metal lines 211 (for example gate lines or data lines), thereby creating an image loss region 221 at a region on the back face of the display panel 210 corresponding to the camera 220. As shown in FIG. 2A, the camera 220 can only receive the ambient lights at regions outside the image loss region 221. Therefore, the metal lines 211 (for example gate lines or data lines) within the display panel 210 of the imaging apparatus 200 as shown in FIGS. 2A and 2B will shield information of the ambient lights coming from the external environment, resulting in loss of information of the picture taken by the camera 220.

In order to at least partially solve the above shortcomings, an embodiment of the present disclosure provides an imaging apparatus. A display panel of the imaging apparatus includes a first face and a second face arranged opposite to each other. An imaging device is located on the second face of the display panel. An optical assembly is located on an optical path where ambient lights pass through the first face and the second face in sequence and enter the imaging device. Further, this optical assembly is configured to refract at least part of the ambient lights so that the refracted ambient lights can bypass shielding members within the display panel and be incident on the imaging device.

In particular, the first face can be a surface which faces towards an incident direction of the ambient lights. For example, the first face is a surface where the display panel provides display contents to the user, an outside face where a packaging substrate (for example made of plastics or glass materials) of the display panel is located, or an outside face where a protect glass is located after module packaging of the display panel, or the like.

In particular, the second face can be a surface which faces away from the incident direction of the ambient lights. For example, the second face is a back plate of the display panel where it faces away from the surface for providing display contents to the user, or an outside face of a substrate in an array substrate of the display panel (that is, a substrate surface facing away from the packaging substrate, which can be made of plastics or glass materials).

Figure 3A:
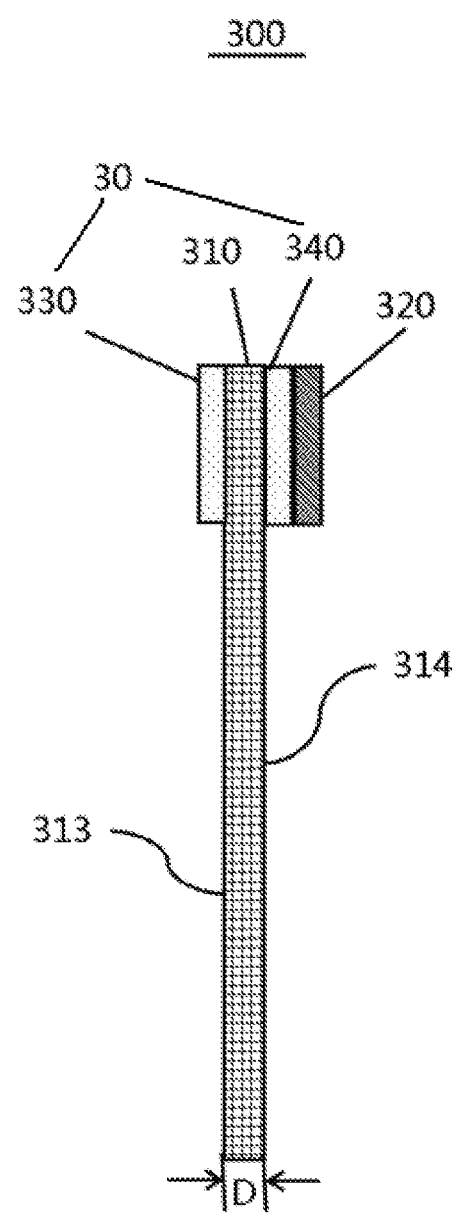
FIG. 3A depicts a side view of an imaging apparatus in accordance with an embodiment of the present disclosure.

In one example, FIG. 3A depicts a side view of an imaging apparatus 300 in accordance with an embodiment of the present disclosure. As shown, the imaging apparatus 300 includes a display panel 310, an imaging device 320 and an optical assembly 30. In order to describe the inventive concept of the present disclosure more clearly, only these components relevant to the present concept of the present disclosure are illustrated and described herein. Apparently, besides these components, a display apparatus including the imaging apparatus 300 can further include other components such as the telephone receiver, the printed circuit board, the capacitive fingerprint sensor, the distance sensor and the light sensor or the like, and they are provided at the suitable positions as required. For example, the capacitive fingerprint sensor can be provided on a side face or a back face of the display panel, which increases the ratio of screen to body to some extent. The telephone receiver can be designed as a piezoelectric ceramic telephone receiver and placed at the back face of the display panel. An ultrasonic distance sensor can be adopted and placed at the back face of the display panel. An ambient light sensor can be placed on the top of a frame of a terminal.

In some embodiments, as shown in FIG. 3A, the display panel 310 includes a first face 313 and a second face 314 arranged opposite to each other. A face or surface where the display area of the display panel 310 is located can be selected as the first face 313, and the other face of the display panel which is opposite to the first face is selected as the second face 314. The imaging device 320 is located on the second face 314 of the display panel 310. As described above, the imaging device 320 herein is referred to the camera or other imaging devices for taking photos (for example CCD, CMOS, infrared imaging elements or other imaging elements) which was/were located the first face 313 of the display panel 310, as described above. It should be understood that such imaging device 320 is not limited to such application, and the skilled person in the art can also choose other alternative application based on the contents of the present disclosure.

Figure 4A:
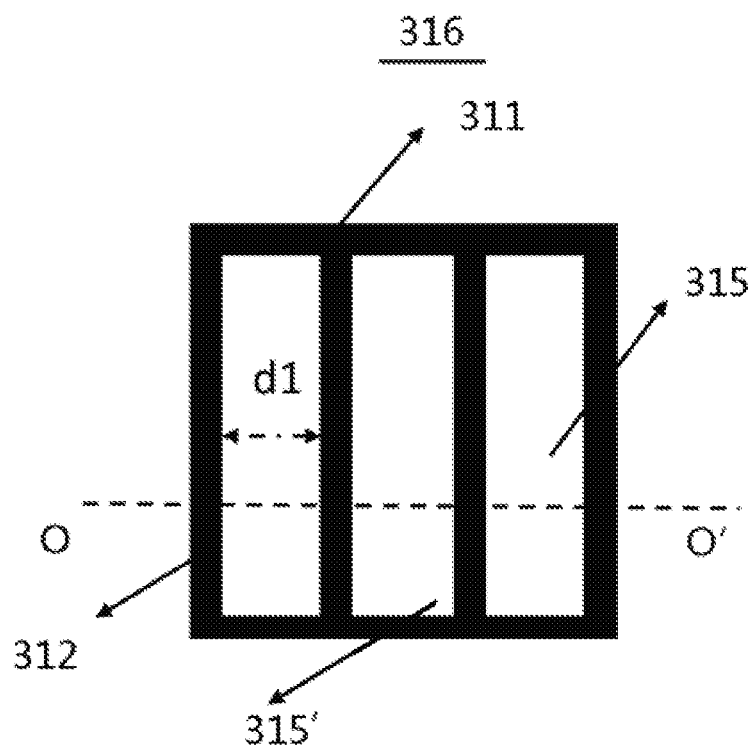
FIG. 4A is a schematic top view of part of pixel structures in a display panel corresponding to an imaging device in accordance with an embodiment of the present disclosure.

The optical assembly 30 is located on the optical path where the ambient lights pass through the first face 311 and the second face 312 in sequence and enter the imaging device 320, and is configured to refract at least part of the ambient lights so that the refracted lights can bypass the shielding members 311, 312 (for example the gate lines 311 or the data lines 312 as shown in FIG. 4A) in the display panel and be incident on the imaging device 320.

In some embodiments, the optical assembly 30 includes a first optical component 330 and a second optical component 340. The first optical component 330 can be a light diverging device and be located at one side where the first face 313 of the display panel 310 is located; and the second optical component 340 can be a light converging device and be located at the other side where the second face 314 of the display panel 310 is located.

Positions of the first optical component 330 and the second optical component 340 are not limited to these as shown in FIG. 3A. In some embodiments, the first optical component 330 and the second optical component 340 are directly located (or integrated) onto the first face 313 and the second face 314 of the display panel 310 respectively. As discussed below with reference to the optical path diagram and a view of relationship of the corresponding optical geometric structures when the imaging device 320 is imaging, the positions of the first optical component 330 and the second optical component 340 can be set specifically depending on the imaging parameters of the imaging device 320. In other words, FIG. 3A only illustrates a certain example, i.e., the first optical component 330 and the second optical component 340 can just be located at the first face 313 and the second face 314 of the display panel 310 respectively. The skilled person in the art shall appreciate that the first optical component 330 can also be located at any position or any layer (for example a layer where the black matrix or the color filter is located) of an opposing substrate of the display panel 310 which is arranged opposite to the array substrate, or even can be located at a suitable position on the array substrate (for example, a layer where the transistors are located). As such, the second optical component 340 can not only at the different positions or layers on the array substrate, the second optical component 340 can but also be located at a suitable position of the opposing substrate.

In some embodiments, the first optical component 330 and the second optical component 340 are located at different layers of the array substrate or the opposing substrate of the display panel 310. The skilled person in the art can integrate or add the process of producing the first optical component 330 and the second optical component 340 on a basis of original producing processes, without any excessive modifications. Therefore, the imaging apparatus 300 of the present disclosure has a simple structure and is easily manufactured.

The display panel 310 in the imaging apparatus 300 provided by the present disclosure can be a self-luminescent display panel, for example, an OLED (Organic Light Emitting Diodes) display panel, a QLED (Quantum Dot Light Emitting Diodes) display panel, a MicroLED (Micro Light Emitting Diodes) display panel, a Mini LED (Mini Light Emitting Diodes) display panel. Alternatively, the display panels which need backlights can be used, for example a liquid crystal display panel, and lights emitted from the backlight module in the liquid crystal display panel are controlled so as not to cover the ambient lights to be incident on the imaging device 320.

Figure 3B:
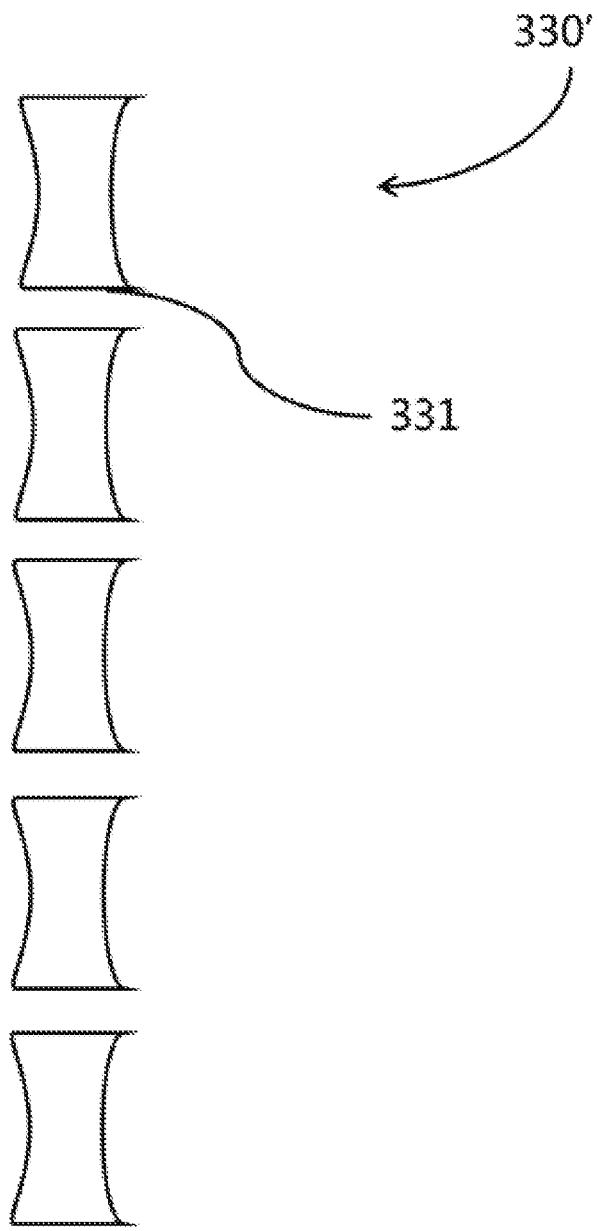
FIGS. 3B and 3C depict schematic views of specific examples of a first optical component and a second optical component as shown in FIG. 3A respectively.
Figure 3C:
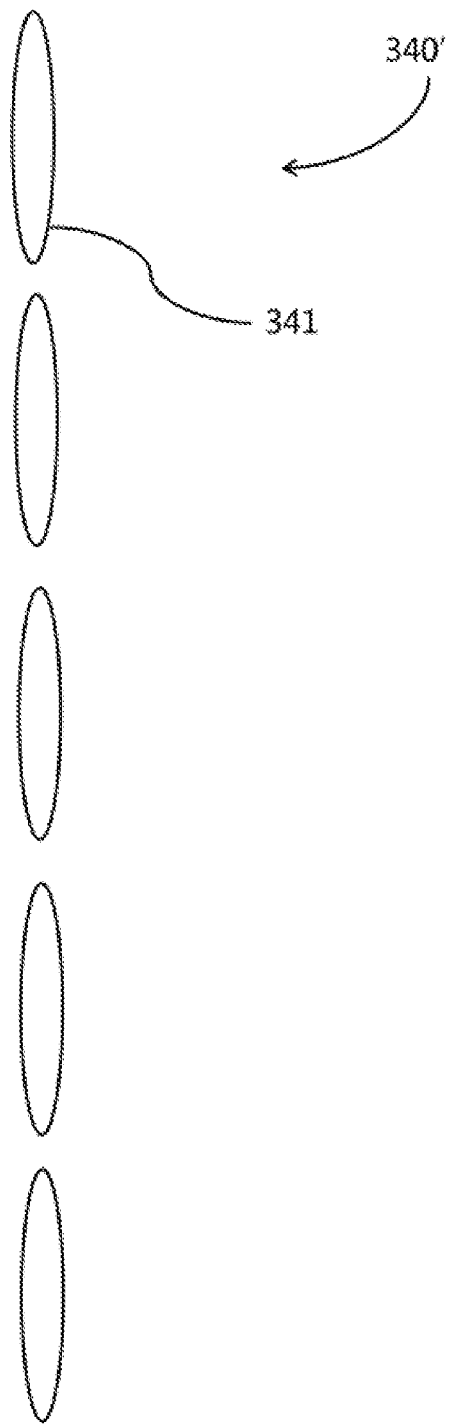

FIGS. 3B and 3C depict schematic views of specific examples of a first optical component and a second optical component as shown in FIG. 3A respectively. In some embodiments, the first optical component 330 includes a concave lens array 330', and the second optical component 340 includes a convex lens array 340'. It should be noted herein that besides the above described concave lens array or convex lens array, the first optical component 330 and the second optical component 340 can also be other types of light diverging devices or light converging devices, for example MEMS lens devices. That is, the first optical component 330 and the second optical component 340 are not limited to the forms of the concave lens array 330' or convex lens array 340' as described herein.

In some embodiments, the concave lens array 330' can include a plurality of concave lenses 331. The convex lens array 340' can include a plurality of convex lenses 341. The concave lenses 331 and the convex lenses 341 are provided in one-to-one correspondence and constitute pairs of concave lens and convex lens. For example, for each pair of the concave lens and convex lens, a center of the concave lens is aligned with a center of the convex lens.

In some embodiments, the shielding members in the display panel 310 include gate lines 311 and data lines 312 (please see FIG. 4A) in the display panel 310. Each pair of the concave lens and convex lens is provided to be aligned with one of the gate lines 311 or one of the data lines 312 in the display panel 310 in terms of position. The phrase of "Each pair of the concave lens and convex lens is provided to be aligned with one of the gate lines 311 or one of the data lines 312 in the display panel 310 in terms of position" means a center point of the one of the gate lines 311 or the one of the data lines 312 is at an axis of the pair of the concave lens and convex lens, on the other words, the axis of the pair of the concave lens and convex lens passes through the center point of the one of the gate lines 311 or the one of the data lines 312. For example, as shown in FIG. 5B, the center point O2 of a data line 312 is at the axis O1-O1' of the pair of the concave lens and convex lens (including the concave lens 331 and the convex lens 341). "O1" represents a center of the concave lens 331 and "O1'" represents a center of the convex lens 341. In the example, the axis O1-O1' is substantially perpendicular to the display panel 310. That is, the pair of the concave lens and convex lens is aligned the data line 312. As such, the definition for aligning the pair of the concave lens and convex lens with a gate line 311 is similar. The details will be omitted herein.

In some embodiments, the pairs of the concave lens and convex lens are arranged in a matrix form at some corresponding partial regions of the display panel, for example arranged adjacent to each other or discretely.

Figure 4B:
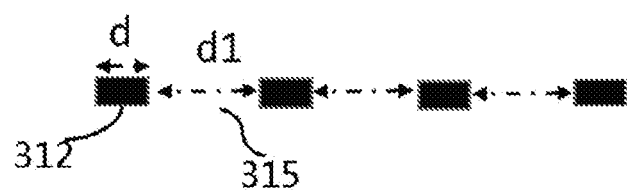
FIG. 4B is a schematic cross-sectional view of part of the pixel structures in the display panel corresponding to the imaging device which is cut along a line O-O' of FIG. 4A.

FIG. 4A is a schematic top view of part of pixel structures 316 in a display panel 310 corresponding to an imaging device 320 in accordance with some embodiments of the present disclosure. FIG. 4B is a schematic cross-sectional view of part of the pixel structures 316 corresponding to the imaging device 320, which is cut along a line O-O' of FIG. 4A. Please be noted that FIG. 4A only illustrates the schematic view of the part of the pixel structures 316 in the display panel 310 corresponding to the imaging device 320, that is, the pixel structures 316 are formed by two gate lines 311 and four data lines 312, thereby the pixel structures 316 include three pixel regions 315.

In conjunction with the description about FIG. 2B and with reference to FIG. 4A, the imaging device 320 normally receives ambient lights from the outside of the imaging apparatus 300, so as to achieve the function of imaging. In other words, at least a part of the ambient lights are necessary to bypass metal line grids (i.e., the shielding members) composed of the gate lines 311 and the data lines 312 of the pixel structures 316 within the display panel 310, and are incident on the imaging device 320. In some embodiments, part of the ambient lights will also be transmitted through the pixel structures 316 in the display panel 310 and be incident on the imaging device 320. Thus, in some embodiments of the present disclosure, the pixel structures 316 within the above described display panel 310 corresponding to the imaging regions of the imaging device 320 are provided to be partially transparent, or lights emitted from such pixel structures 316 themselves will not disturb the imaging of the ambient lights on the imaging device 320, or these pixel structures 316 will be closed so as not to display upon imaging, so that the ambient lights are partially transmitted so as to enhance the imaging of the imaging device (for example, such pixel structures can be transparent).

For example, two pixel regions 315 at a left side and a right side of the structure as shown in FIG. 4A are provided to at least partially transmit the ambient lights, whereas the pixel region 315' at the middle part is provided to display images as the normal pixel structures do. Some of the pixel regions can be chosen flexibly to display the images as required, while the others of the pixel regions can be chosen to transmit the ambient lights.

For example, taking OLED or QLED as one example, by means of the processes such as masking, photolithographic process, the pixels of the pixel regions 315 (for example at the left and right sides) within the display panel 310 corresponding to the imaging regions of the imaging device 320 are provided to transmit the ambient lights. This purpose can be achieved by a plurality of structure designs. For example, during a process of forming the pixel structures by evaporation or ink jet printing, only a cathode layer and an anode layer are formed without forming a light emitting layer (that is, for the pixel regions which need to at least partially transmit the ambient lights, the pixel structures thereof are not provided with the light emitting layer). In this way, the pixel region 315' at the middle part corresponding to the imaging regions of the imaging device 320 can display images as required or partially transmit the ambient lights and then be incident onto the imaging regions; whereas the pixel regions 315 at the left and right sides can be provided as required so that the ambient lights are refracted and then incident on the imaging regions.

Figure 8:
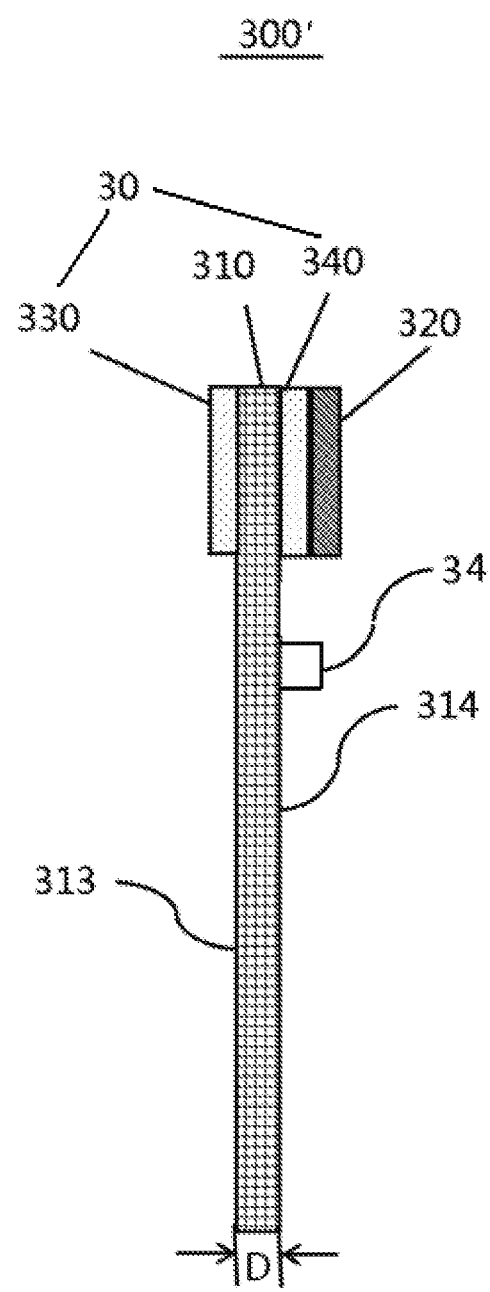
FIG. 8 depicts a side view of an imaging apparatus in accordance with another embodiment of the present disclosure.

As an example, the imaging apparatus 300' can further include a controller 34 as shown in FIG. 8. The controller 34 is configured to stop light emitting operations of the pixel regions 315, 315' corresponding to (in alignment with) the imaging device 320 before the imaging device 320 takes photos, and restore the light emitting operations of the pixel regions 315, 315' corresponding to the imaging device 320 after the imaging device 320 took photos. In FIG. 8, the controller 34 is provided on the second face 314 of the display panel; however, this is only illustrative, that is, the controller 34 can alternatively be provided at other positions, for example, be provided within the display panel, or even can be provided at a remote position from the display panel by means of a wireless or wire connection, so as to control the pixel region on the display panel.

Herein, the expression "the pixel regions corresponding to the imaging device" means that the ambient lights passing through the display panel and entering the imaging device at least partially go through these pixel regions.

For example, taking the self-luminescent display panel as an example, when the user wants to use the imaging device 320 to take photos freely, the display pixels of the pixel structures corresponding to the imaging device 320 can be adaptively closed, for example closing all or part of the display pixels. In some embodiments, on the basis of the signals from the controller it may be instructed to close all the display pixels on the whole display panel or part of the display pixels in the regions of the display panel corresponding to the imaging device 320. In some embodiments, in response to whether the above pixel regions 315 are provided with the corresponding concave lenses and convex lenses or not, by means of the signal from the controller, the display pixels within the pixel regions 315 are turned off or turned on. In some embodiments, the imaging device 320 includes some imaging elements having selectivity of light wavelength (for example, the infrared imaging is used so that iris is perceived or a black and white image is formed). The cathode layer or anode layer at a side of the pixel structures in the pixel structures 316 which correspond to the imaging device 320, close to the imaging device 320 has the selectivity of wavelength, so as to achieve that the ambient lights can bypass the shielding members within the display panel 310 and then be incident on the imaging device 320. For example, the provision of the infrared filter or the infrared narrow band filter permits passage of the infrared rays but does not permit passage of other light rays, so that the infrared imaging is formed.

As shown in FIG. 4A, the shielding members in the display panel 310 are typically metal grids consisting of the gate lines 311 and the data lines 312. Therefore, in some embodiments, the first optical component 330 includes a concave lens array 330' and the second optical component 340 includes a convex lens array 340'. The concave lens array or convex lens array in a predetermined pattern can be arranged as required, at positions corresponding to the gate lines 311 or the data lines 312 in the pixel structures 316. For example, the pairs of the concave lens and convex lens are provided at positions corresponding to the gate lines 311 or the data lines 312 around the pixel regions 315 at the left and right sides.

Below, how to provide the first optical component 330, the second optical component 340 and the imaging device 320 and the relevant imaging principles thereof will be explained in combination with the two different imaging assemblies provided by the embodiments of the present disclosure.

Again with reference to FIGS. 4A and 4B, a width of one pixel region 315 is indicated as d1, and the width of one data line 312 is set to be d. Although a width of one gate line 311 is not shown, in the present example the gate line 311 is made to have the same width d as the data line 312, so as to set them in a similar way. Of course, the data line 312 and the gate line 311 can also be set to have different widths, but in the present example, they are set to have the same width in order to explain the contents of the present disclosure more clearly.

In the present example, the shielding members in the display panel 310 are considered as examples of the data lines 312 or gate lines 311 within the display panel 310 (or they together form the metal grids). Of course, in other examples, the shielding members can further include other shielding members such as the black matrix.

Figure 5A:
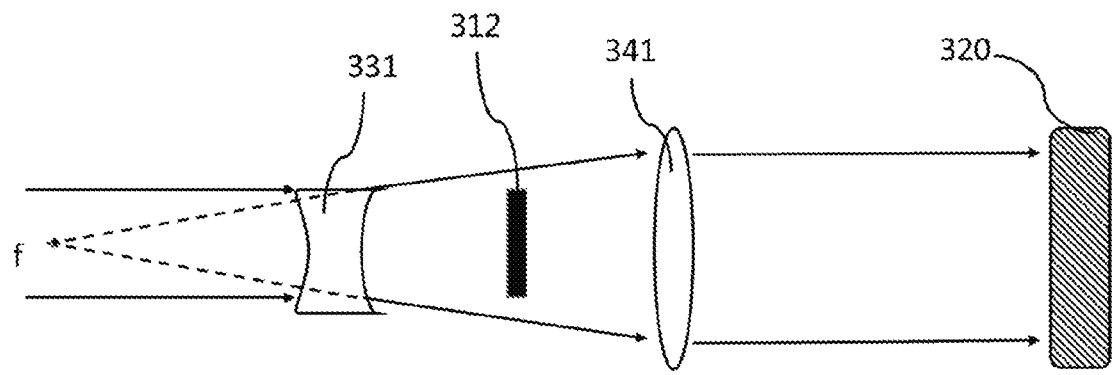
FIG. 5A is an optical path diagram of the imaging apparatus in accordance with an embodiment of the present disclosure, when the imaging device is imaging.
Figure 5B:
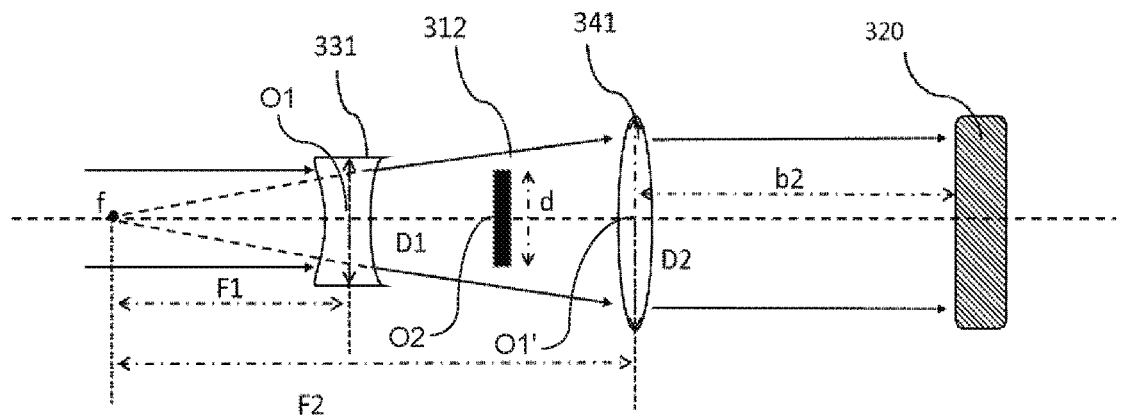
FIG. 5B is a schematic view of geometric relationship between an optical assembly and the imaging device on the imaging apparatus as shown in FIG. 5A.

With reference to FIGS. 5A and 5B, they respectively show an optical path diagram of the imaging apparatus in accordance with an embodiment of the present disclosure when the imaging device is imaging and a schematic view of geometric relationship between an optical assembly and the imaging device on the imaging apparatus as shown in FIG. 5A. Only one pair of concave lens and convex lens which is formed by one concave lens in the concave lens array 330' and one convex lens in the convex lens array 340' is shown out in FIGS. 5A and 5B and used as one example for explanation.

FIG. 5A shows that the ambient lights from the external environment (indicated by arrow lines) are firstly incident on the concave lens 331 in the pair of the concave lens and convex lens, and then the concave lens 331 diverges the ambient lights. In this way, at least part of the ambient lights can bypass the data line 312. After that, through the refraction of the convex lens 341 in the pair of the concave lens and convex lens, this part of the ambient lights will converge into an angle equal to the angle at which the ambient lights are incident on the concave lens 331 and be incident on the imaging device 320. It can be seen from FIG. 5A that if the pair of the concave lens and convex lens of the present disclosure is not provided, this illustrated part of the ambient lights will be blocked by the data line 312 and could not be incident on the imaging device 320.

With reference to FIG. 5B, the concave lens 331 and the convex lens 341 in each pair of the concave lens and convex lens have the same focus point f. In order to achieve the purpose of avoid degrading the display effect, the concave lens and the convex lens in each pair of the concave lens and convex lens should meet the following relationship:

$$\frac{D1}{F1} = \frac{D2}{F2} = \frac{D2}{F1+D}, \quad (1)$$

An aperture D2 of the convex lens satisfies the following condition:

i. $d \leq D2 \leq d+d1$ (2).

where F1 indicates a focal length of the concave lens, D1 indicates an aperture of the concave lens, D indicates a thickness of the display panel 310, and F2 and D2 indicate a focal length and an aperture of the convex lens respectively.

In addition, d indicates a width of one gate line 311 or one data line 312, and d1 indicates a width of a pixel region 315 (or called as an opening area) corresponding to the pair of concave lens and convex lens within the display panel 310. Herein, the "pixel region corresponding to the pair of concave lens and convex lens" means that orthographic projections of the concave lens and the convex lens onto the display panel both at least partially fall within this pixel region.

In some embodiments, the aperture D1 of the concave lens can be selected to equal to the width d of the gate line 311 or the data line 312. A distance between the concave lens 331 and the convex lens 341 of the pair of the concave lens and convex lens can be selected to equal to the thickness D of the display panel 310.

Provided that d, D and the distance b2 from the concave lens to the imaging device 320 are known, the parameters such as the aperture and the focal length of the concave lens 331 and the convex lens 341 can be solved by the above equations (1) and (2).

Specifically, in an embodiment of taking the parameters of the display panel for the mobile phone of 500 PPI as an example, D1 and D can be taken as 10 μm and 200 μm respectively, the width d1 of the pixel region 315 can be taken as 50 μm, and in this case, 10 μm≤D2≤60 μm, D2 is taken as 40 μm. On the basis of the equation (1), it can be known that F1=F2=67 μm.

Figure 6A:
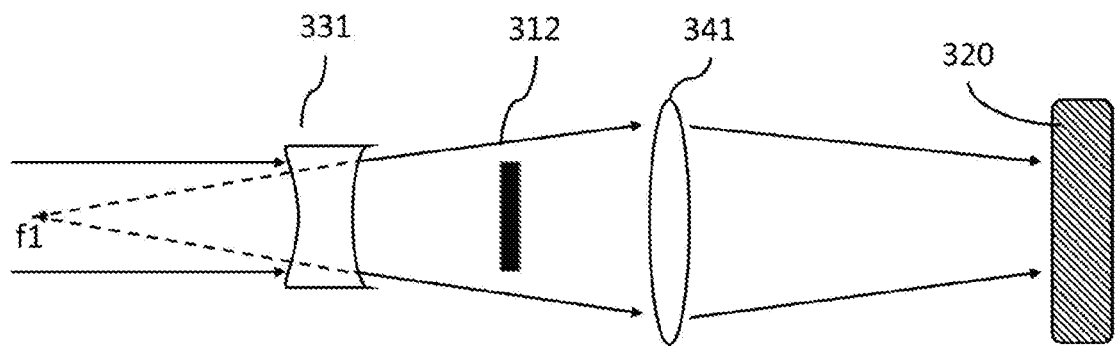
FIG. 6A is an optical path diagram of the imaging apparatus in accordance with another embodiment of the present disclosure, when the imaging device is imaging.
Figure 6B:
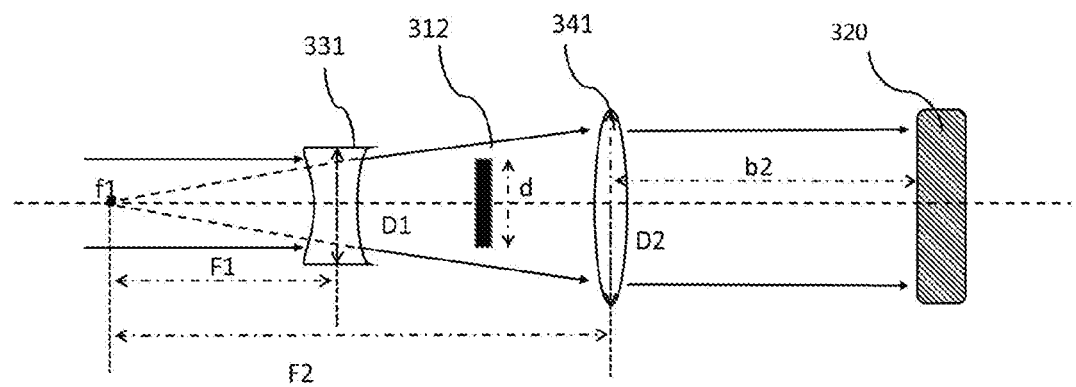
FIG. 6B is a schematic view of geometric relationship between an optical assembly and the imaging device on the imaging apparatus as shown in FIG. 6A.

FIG. 6A depicts an optical path diagram of the imaging apparatus in accordance with some embodiments of the present disclosure, when the imaging device is imaging. FIG. 6B depicts a schematic view of geometric relationship between an optical assembly and the imaging device on the imaging apparatus as shown in FIG. 6A.

The concave lens 331 and the convex lens 341 in the pair of the concave lens and convex lens in FIGS. 6A and 6B have different focus points, though only the focus point f1 of the concave lens 331 is illustrated in the figures. The difference of this example from the example as shown in FIGS. 5A and 5B lies in that by providing the concave lens 331 and the convex lens 341 with the different focus points, it can achieve that after bypassing the data line 312, the ambient lights can be converged or collected by the convex lens 341 so that the ambient lights are incident on more imaging regions on the imaging device 320 or on the region which is closer to a center of the corresponding imaging region. In some embodiments, by adjusting the parameters of the lenses within the pair of the concave lens and convex lens, as compared with the case that any shielding member is not provided on the optical path of the ambient lights incident on the imaging device 320, the same imaging effect or the essentially same imaging effect is achieved.

As described above, the concave lens 331 and the convex lens 341 in each pair of the concave lens and convex lens have different focus points, so the optical parameters of the concave lens 331 and the convex lens 341 in each pair of the concave lens and convex lens shall satisfy the following relationship:

$$\frac{1}{a2} + \frac{1}{b2} = \frac{1}{F2}, \quad (3)$$

i. $a2 = F1 + D$, (4)

b. $\frac{D1}{F1} = \frac{D2}{F1+D}, \quad (5)$ where F1 and D1 respectively indicate a focal length and an aperture of the concave lens 331, F2 and D2 respectively indicate a focal length and an aperture of the convex lens 341, b2 indicates a distance from the imaging device 320 to the convex lens 341, a2 indicates a distance from the convex lens 341 in the pair of the concave lens-convex lens to the focus point f1 of the concave lens 331, and D indicates a thickness of the display panel 310.

An aperture D2 of the convex lens 341 satisfies the following condition:

$d \leq D2 \leq d+d1$.

where d indicates the width of one gate line 311 or one data line 312, d1 indicates a width of the pixel region 315 corresponding to the pair of concave lens and convex lens within the display panel 310.

In some embodiments, the aperture D1 of the concave lens 331 is equal to the width d of the gate line 311 or the data line 312, and the distance between the concave lens 331 and the convex lens 341 in the pair of the concave lens and convex lens is equal to the thickness D of the display panel 310.

On the basis of the above equations (3), (4) and (5), provided that D1, D, b2 and D2 are known, F1 and F2 can be solved out.

In an embodiment of taking the parameters of the display panel for the mobile phone of 500 PPI as an example, D1 can be 10 μm, D can be 200 μm, b2 is 50 μm, d1 is a width or opening area of the pixel region 315 and can be 50 μm, i.e., 10 μm≤D2≤60 μm, D2 is 40 μm.

F1 can be solved out by the equation (5) as F1=67 µm, and F2 can be solved out by the equations (3) and (4) as F2=42 µm. After that, the calculation is performed on the following equation of lens focal length.

$$F = \frac{r}{n-1} \quad (6)$$

In the equation (6), F indicates a focus point of the concave lens or convex lens, r indicates a radius of curvature, and n indicates a refraction index.

In a condition that the refraction index of the lens is known, the radius of curvature can be solved out from the equation (6).

In some embodiments, if the refraction indexes of the concave lens 331 and the convex lens 341 both are 1.5 and it can be known from the above that the focal lengths F1, F2 of the concave lens 331 and the convex lens 341 have been solved out, then the radiuses of curvature of the concave lens 331 and the convex lens 341 are solved out to be 33.5 µm and 21 µm respectively.

It can be apparent from the examples as shown in FIGS. 5A and 5B and as shown in FIGS. 6A and 6B that the first optical component 330 and the second optical component 340 provided by an embodiment of the present disclosure can be provided at different positions of the display panel depending on the different optical parameters, for example, one or both of them is/are provided within the display panel, on a surface of the display panel, or outside the display panel.

In some embodiments, the first optical component 331 and/or the second optical component 340 can be set in a form of layer or film, so as to facilitate integrating its producing step into the manufacturing process of the display panel 310, for example, the concave lens array or the convex lens array is made into the form of layer or film. When the first optical component 330 and/or the second optical component 340 is/are layers, the first optical component 330 and the second optical component 340 can be formed at the selected positions by for example attaching or adhering or other fixing means. For example, the first optical component 330 and the second optical component 340 can be directly provided or attached onto the first face 313 and the second face 314 of the display panel 310.

In some embodiments, the concave lens array of the first optical component 330 can be provided to at least partially include column lens and/or spherical lens. Correspondingly, the convex lens array of the second optical component 340 can be provided to at least partially include column lens and/or spherical lens.

In some embodiments, taking a screen of the mobile phone or tablet personal computer as an example, in a case that other devices such as the telephone receiver are provided at other positions (for example a frame) of the imaging apparatus except the first face, the entire first face of the display panel in the imaging apparatus provided by the present disclosure can be fully used for image display.

In accordance with another embodiment of the present disclosure, it further provides a method S100 for producing the above imaging apparatus.

Figure 7:
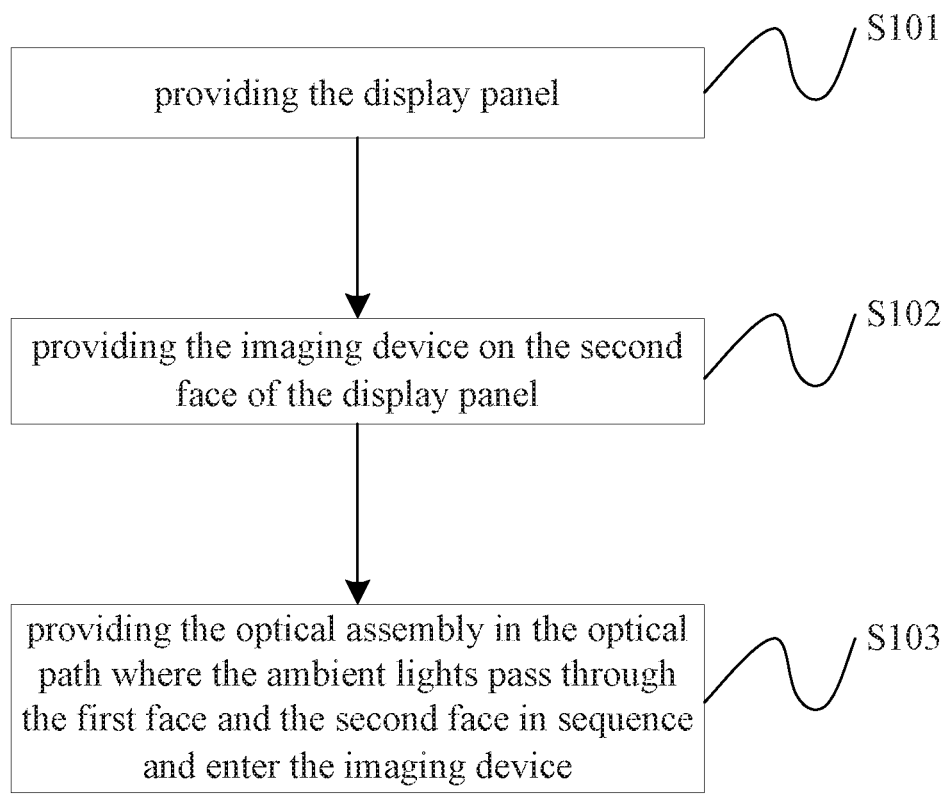
FIG. 7 depicts a flowchart of a method of producing the imaging apparatus in accordance with an embodiment of the present disclosure.

As shown by FIG. 7, the method S100 for producing the imaging apparatus in accordance with the embodiment of the present disclosure includes:
Step S101: providing the display panel 310;
Step S102: positioning the imaging device 310 onto the second face 314 of the display panel 310; and
Step S103: providing the optical assembly 30 on the optical path where the ambient lights pass through the first face 313 and the second face 314 in sequence and enter the imaging device 320.

In addition, as described above, the optical assembly 30 in the embodiment of the present disclosure includes a first optical component 330 and a second optical component 340. The first optical component 330 is a light diverging device and the second optical component 340 is a light converging device. In some embodiments, the first optical component 330 can be a concave lens array 330' and of course it can alternatively be a concave lens with a relatively large size or other types of the light diverging devices. Similarly, the second optical component 340 can be a convex lens array 340' and of course it can alternatively be a convex lens with a relatively large size or other types of the light converging devices.

When the first optical component 330 is the concave lens array 330' and the second optical component 340 is the convex lens array 340' and they are respectively located at either side of the display panel 310, the step of providing the optical assembly 30 can includes providing the concave lens array 330' at one side where the first face 313 of the display panel 310 is located and providing the convex lens array 340' at the other side where the second face 314 of the display panel 310 is located. In some embodiments, at least one of the concave lens array 330' and the convex lens array 340' is provided in a form of film or layer. For example, by means of processes such as masking and etching, the concave lens array 330' and the convex lens array 340' can be formed within one layer or film, and be provided at desired positions.

As shown in FIG. 3A, in some embodiments, the concave lens array 330' and the convex lens array 340' can be just arranged on the first face 313 and the second face 314 of the display panel 310 respectively. At this time, the concave lens array 330' or the convex lens array 340' in the form of layer or film can directly be overlaid on the first face 313 or the second face 314 of the display panel 310, for example being attached or adhered onto the first face 313 or the second face 314.

In some embodiments, the concave lens array 330' and the convex lens array 340' are arranged into the layer within the display panel 310, for example, the concave lens array 330' and the convex lens array 340' are respectively integrated into the layer structure of the display panel 310 during the manufacturing process of the display panel.

With the imaging apparatus and the method for producing the imaging apparatus provided by embodiments of the present disclosure, the problems that the metal lines (for example gate lines or data lines) within the display panel shield the information of the lights from the external environment so that it results in the loss of the picture information when taken by the front camera, are solved by means of providing the optical assembly at one side where the first face of the display panel is located and at the other side where the second face of the display panel is located. In other embodiments, the optical assembly includes the first optical component and the second optical component. The first optical component and the second optical component are respectively the concave lens array and the convex lens array, the shapes of which are consistent with the positions of the metal lines to shield lights, and they are column lenses. In this way, the technical effect that the metal grid within the display panel would not shield all the environment information can be achieved by selecting the different lens parameters.

An embodiment of the present disclosure also provides a mobile terminal device, including the imaging apparatus as describe in any of the above embodiments. The mobile terminal device may include such as a mobile phone, a tablet computer, a notebook computer, or a mobile navigator.

The above embodiments illustratively explain the principle and construction of the present disclosure, rather than limiting the present disclosure. The person skilled in the art shall understand that any changes and modifications made to the present disclosure fall within the scope of the present disclosure, without departing from the general concept of the present disclosure. The protection scope of the present disclosure shall be defined by the appended claims of the present application.

What is claimed is:

1. An imaging apparatus, comprising:
a display panel, comprising a first face and a second face opposite to each other;
an imaging device on the second face of the display panel; and
an optical assembly in an optical path where ambient lights pass through the first face and the second face in sequence and enter the imaging device, the optical assembly being configured to refract at least part of the ambient lights so that the refracted lights bypass shielding members in the display panel and are incident on the imaging device,
wherein the optical assembly comprises a first optical component at one side where the first face of the display panel is located and a second optical component at the other side where the second face of the display panel is located,
wherein the first optical component comprises a concave lens array and the second optical component comprises a convex lens array,
wherein the concave lens array comprises a plurality of concave lenses, the convex lens array comprises a plurality of convex lenses, and the plurality of concave lenses and the plurality of convex lenses are provided in one-to-one correspondence and constitute a plurality of pairs of concave lens and convex lens,
wherein the concave lens and the convex lens of each pair of concave lens and convex lens have a same focus point, and
wherein optical parameters of the concave lens and the convex lens of the each pair of concave lens and convex lens meet the following relationship:

$$\frac{D1}{F1} = \frac{D2}{F2} = \frac{D2}{F1+D}$$

where F1 and D1 indicate a focal length and an aperture of the concave lens respectively, D indicates a thickness of the display panel, and F2 and D2 indicate a focal length and an aperture of the convex lens respectively, and wherein the shielding members in the display panel comprise gate lines and data lines within the display panel.

2. The imaging apparatus as claimed in claim 1, wherein each pair of concave lens and convex lens is provided to align with one of the gate lines or one of the data lines within the display panel in position.

3. The imaging apparatus as claimed in claim 2, wherein the aperture D2 of the convex lens satisfies the following condition:

$$d \leq D2 \leq d+d1;$$

where d indicates a width of each of the gate lines or each of the data lines, d1 indicates a width of a pixel region corresponding to the each pair of concave lens and convex lens within the display panel.

4. The imaging apparatus as claimed in claim 3, wherein the aperture D1 of the concave lens is equal to the width d of each of the gate lines or each of the data lines, and a distance between the concave lens and the convex lens of the each pair of the concave lens and convex lens is equal to the thickness D of the display panel.

5. The imaging apparatus as claimed in claim 2, wherein the concave lens and the convex lens of each pair of concave lens and convex lens have different focus points from each other, and optical parameters of the concave lens and the convex lens of the each pair of concave lens-convex lens meet the following relationship:

$$\frac{1}{a2} + \frac{1}{b2} = \frac{1}{F2}$$
$$a2 = F1 + D,$$
$$\frac{D1}{F1} = \frac{D2}{F1+D},$$

where F1 and D1 respectively indicate a focal length and an aperture of the concave lens, F2 and D2 respectively indicate a focal length and an aperture of the convex lens, b2 indicates a distance from the imaging device to the convex lens, a2 indicates a distance from the convex lens in the each pair of the concave lens and convex lens to the focus point of the concave lens, and D indicates a thickness of the display panel;

wherein the aperture D2 of the convex lens satisfies the following condition:

$$d \leq D2 \leq d+d1;$$

where d indicates a width of each of the gate lines or each of the data lines, d1 indicates a width of a pixel region corresponding to the each pair of concave lens and convex lens within the display panel.

6. The imaging apparatus as claimed in claim 5, wherein the aperture D1 of the concave lens is equal to the width d of each of the gate lines or each of the data lines, and a distance between the concave lens and the convex lens of the each pair of the concave lens and convex lens is equal to the thickness D of the display panel.

7. The imaging apparatus as claimed in claim 1, wherein the first face comprises a display area.

8. The imaging apparatus as claimed in claim 7, wherein the display area fully covers the first face.

9. The imaging apparatus as claimed in claim 1, wherein a pixel region within the display panel corresponding to the imaging device is configured to transmit at least part of the ambient lights passing through the first face to the second face.

10. The imaging apparatus as claimed in claim 1, further comprising a controller, configured to stop light emitting operation of a pixel region corresponding to the imaging device before the imaging device takes photos, and to restore the light emitting operation of the pixel region corresponding to the imaging device after the imaging device takes photos.

11. The imaging apparatus as claimed in claim 1, wherein the first optical component is in a form of layer, and the layer of the first optical component is directly located on the first face of the display panel.

12. The imaging apparatus as claimed in claim 1, wherein the second optical component is in a form of layer, and the layer of the second optical component is directly located on the second face of the display panel.

13. The imaging apparatus as claimed in claim 1, wherein at least part of the first optical component or the second optical component comprises column lenses or spherical lenses.

14. A mobile terminal device, comprising:
the imaging apparatus as claimed in claim 1.

15. The mobile terminal device as claimed in claim 14, wherein the optical assembly comprises a first optical component at one side where the first face of the display panel is located and a second optical component at the other side where the second face of the display panel is located.

16. The mobile terminal device as claimed in claim 15, wherein the first optical component comprises a light diverging device and the second optical component comprises a light converging device.

17. A method for producing an imaging apparatus of claim 1 wherein the method comprises:
providing the display panel;
providing the imaging device on the second face of the display panel; and
providing the optical assembly in the optical path where the ambient lights pass through the first face and the second face in sequence and enter the imaging device.

* * * * *